United States Patent [19]

Iwamoto et al.

[11] Patent Number: 5,191,046

[45] Date of Patent: Mar. 2, 1993

[54] TRANSPARENT HEAT-RESISTANT STYRENE-BASE COPOLYMER

[75] Inventors: Mune Iwamoto, Yokohama; Norifumi Ito, Kamakura; Tetsuyuki Matsubara; toshihiko Ando, both of Yokohama, all of Japan

[73] Assignee: Mitsui Toatsu Chemicals, Incorporated, Tokyo, Japan

[21] Appl. No.: 663,083

[22] Filed: Mar. 1, 1991

Related U.S. Application Data

[63] Continuation of Ser. No. 524,695, May 18, 1990, abandoned, which is a continuation of Ser. No. 867,098, May 17, 1986, abandoned.

[30] Foreign Application Priority Data

Jun. 3, 1985 [JP] Japan .................. 60-118717

[51] Int. Cl.$^5$ .................................. C08F 22/40
[52] U.S. Cl. ................................................. 526/262
[58] Field of Search ....................................... 526/262

[56] References Cited

U.S. PATENT DOCUMENTS

| | | | |
|---|---|---|---|
| 2,301,356 | 11/1942 | Arnold et al. | 260/04 |
| 2,313,565 | 3/1943 | McDowell et al. | 260/78 |
| 2,342,295 | 2/1944 | Orthner | 260/84 |
| 2,384,239 | 9/1945 | Dorough | 260/78 |
| 2,650,215 | 8/1953 | Strain | 260/77.5 |
| 2,686,774 | 8/1954 | D'Aiello | 260/78 |
| 2,698,316 | 12/1954 | Glammaria et al. | 260/78 |
| 2,708,663 | 5/1955 | Downing et al. | 260/78 |
| 3,202,641 | 9/1962 | Nakajima et al. | 260/79.3 |
| 3,352,832 | 11/1967 | Barr et al. | 260/78 |
| 3,480,598 | 11/1969 | Nield et al. | 260/78.5 |
| 3,639,357 | 2/1972 | Cohen | 260/78 |
| 3,651,171 | 3/1972 | von Bonon et al. | 260/857 |
| 3,652,891 | 3/1972 | Janning | 313/109.5 |
| 3,676,404 | 7/1972 | Nield | 260/78 |
| 3,705,209 | 12/1972 | Matlack et al. | 260/861 |
| 3,766,142 | 10/1973 | Nield et al. | 260/47 |
| 3,778,416 | 12/1973 | Zoller et al. | 260/78 |
| 3,778,416 | 12/1973 | Zoller et al. | 526/262 |
| 4,039,734 | 8/1977 | Hendy | 526/258 |
| 4,072,644 | 2/1978 | Hedrick | 260/29.6 |
| 4,266,037 | 5/1981 | DiGiullo et al. | 521/82 |
| 4,302,484 | 11/1981 | Rosenkranz | 427/44 |
| 4,351,932 | 9/1982 | Steet et al. | 526/262 |
| 4,381,373 | 4/1983 | Ikuma | 525/194 |
| 4,388,451 | 6/1983 | Culbertson et al. | 526/271 |
| 4,504,627 | 3/1985 | Dean | 525/205 |
| 4,625,004 | 11/1986 | Younes | 526/262 |

FOREIGN PATENT DOCUMENTS

| | | |
|---|---|---|
| 1088758 | 10/1967 | United Kingdom . |
| 58-40970 | 3/1983 | Japan . |
| 58-162616 | 9/1983 | Japan . |
| 60-79019 | 5/1985 | Japan . |
| 2010866 | 6/1982 | United Kingdom . |

OTHER PUBLICATIONS

Chemical Abstracts, 93:240248a.
English-Language Abstract WPI Acc. No. 80-66740C/38.
Chemical Abstracts, 103:5488g.
Chemical Abstracts, 100:104081b.

Primary Examiner—Joseph L. Schofer
Assistant Examiner—Peter Mulcahy
Attorney, Agent, or Firm—Fisher, Christen & Sabol

[57] ABSTRACT

A transparent heat-resistant styrene-base copolymer comprising specific amounts of units derived respectively from (a) a styrene-type monomer, (b) a (meth)acrylonitrile monomer and/or (meth)acrylic ester type monomer and (c) a phenylmaleimide monomer, in which the weight ratio (b)/(c) and the ratio of the weight average molecular weight to the number average molecular weight fall within their respective specific ranges and the amount of the phenylmaleimide-type monomer still remaining in the copolymer is below a certain specific concentration.

11 Claims, No Drawings

TRANSPARENT HEAT-RESISTANT STYRENE-BASE COPOLYMER this application is a continuation of prior U.S. application Ser. No. 524,695, filed on May 18, 1990, now abandoned, which is a continuation of prior U.S. application Ser. No. 867,098, filed May 17, 1986, now abandoned.

BACKGROUND OF THE INVENTION

1. Field of the Invention

This invention describes a novel transparent styrene-base copolymer which has excellent heat resistance.

2. Description of the Prior Art:

Polystyrene has conventionally been employed as a moldable and fabricable material which has excellent transparency and mechanical strength. Its use at elevated temperatures however encounters problems since it is inferior in heat resistance. It is therefore desirable to improve its heat resistance.

If improved heat resistance is the sole object, this can be achieved to a certain extent by copolymerizing maleic anhydride with styrene (see, for example, Japanese Patent Publication No. 40970/1983). Styrene-maleic anhydride copolymers, however, have insufficient stability with their molding or fabrication capabilities. They involve problems because they undergo decomposition, gelation and the like when their molding or fabrication temperatures become higher. There is therefore a very large demand for further improvements.

U.S. Pat. No. 3,766,142 discloses a copolymer composed of 25-90 mole percent of acrylonitrile, 1-25 mole percent of an N-arylmaleimide and the remainder of an ethylenically unsaturated monomer. Where the ethylenically unsaturated monomer is an aromatic olefin, the molar ratio of the aromatic olefin to acrylonitrile is disclosed to fall within a range of 0 0.5-4. The above U.S. patent discloses, in Example 33, that a terpolymer capable of providing a transparent plaque was obtained by subjecting acrylonitrile, styrene and N-o-chlorophenylmaleimide to emulsion polymerization.

Copolymers obtained in accordance with the above U.S. patent are however still insufficient in transparency.

U.S. Pat. No. 3,676,404 discloses copolymers each of which is composed of 80-95 wt. percent of methyl methacrylate unit, 5-20 wt. percent of an N-arylmaleimide unit and 0-15 wt. percent of a unit derived from any other ethylenically unsaturated copolymerizable compound (e.g., styrene unit or the like). These copolymers are described as having transparency and strength and as being suitable especially for the molding of various articles which are exposed to relatively high environmental temperatures.

These copolymers are however still insufficient in transparency.

SUMMARY OF THE INVENTION

An object of this invention is to provide a novel styrene-base copolymer which is excellent in both transparency and heat resistance.

The present inventors have found that among styrene-base copolymers which contain N-phenylmaleimide monomers, those having specific monomer compositions and Mw/Mn ratios, Mw being their weight average molecular weights and Mn their number average molecular weights within a particular range are resins which are excellent in heat resistance, mechanical strength and transparency.

The present invention therefore provides a transparent heat-resistant styrene-base copolymer which comprises (a) 30-80 parts by weight of a unit derived from a styrene-type monomer, (b) 5-70 parts by weight of a unit derived from a (meth)acrylonitrile monomer and/or a unit derived from a (meth)acrylic ester type monomer and (c) 2-25 parts by weight of a unit derived from a phenylmaleimide-type monomer, all based on 100 parts by weight of the copolymer, wherein:

(1) the weight ratio (b)/(c) is at least 0.3;
(2) the ratio of the weight average molecular weight Mw of the copolymer to the number average molecular weight Mn of the copolymer in the copolymer, Mw/Mn, is 1.8–3.0; and
(3) the amount of the phenylmaleimide-type monomer still remaining in the copolymer is not more than 0.2 wt. percent.

DETAILED DESCRIPTION OF THE INVENTION

The term "styrene-type monomer" as used herein means styrene or its derivative. It may include, for example, styrene, $\alpha$-methylstyrene, o-methylstyrene, m-methylstyrene, p-methylstyrene, ring-, $\alpha$- or $\beta$-substituted bromostyrene, t-butylstyrene or chlorostyrene, with styrene or $\alpha$-methylstyrene being particularly preferred. They may be used either singly or in combination.

By the term "(meth)acrylonitrile monomer" as used herein is meant acrylonitrile or methacrylonitrile. They may be used either singly or in combination.

The term "(meth)acrylic ester type monomer" as used herein means an alkyl acrylate or methacrylate. It may preferably mean a $C_{1-10}$ alkyl ester of acrylic or methacrylic acid such as methyl acrylate, ethyl acrylate, ethyl methacrylate or cyclohexyl methacrylate. Among these, methyl methacrylate, methyl acrylate or ethyl acrylate is preferred. They may be used either singly or in combination.

On the other hand, the term "phenylmaleimide-type monomer" as used herein means an N-phenyl maleimide substituted by a substituted or unsubstituted phenyl group at the N-position thereof, such as N-phenylmaleimide, N-orthomethylphenylmaleimide, N-orthochlorophenylmaleimide or N-orthomethoxyphenylmaleimide, or a derivative thereof. Among these, N-phenylmaleimide, N-orthochlorophenylmaleimide and N-orthomethoxymaleimide are preferred. For reducing the yellowness of resins, ortho-substituted phenylmaleimides such as N-orthochlorophenylmaleimide and N-orthomethoxymaleimide are preferred. They may be used either singly or in combination.

The relative proportions of the units derived from the respective monomers, which make up the copolymer of this invention, are (a) 30-80, preferably 40-70 parts by weight of the unit derived from the styrene-type monomer, (b) 5-70, preferably 10-60, most preferably 15-40 parts by weight of the unit derived from the (meth)acrylonitrile monomer and/or the unit derived from the (meth)acrylic ester type monomer and (c) 2-25 parts by weight, preferably 10-20 parts by weight of the unit derived from the phenylmaleimide-type monomer, all based on 100 parts by weight of the copolymer.

If the unit derived from the styrene-type monomer is used in any amount less than 30 parts by weight, the resulting copolymer has low heat resistance. Any amounts greater than 80 parts by weight lead to copolymers which have poor mechanical strength. If the unit derived from the (meth)acrylonitrile monomer and/or the unit derived from the (meth)acrylic ester type monomer is used in any amount smaller than 5 parts by weight, the resulting copolymer has poor mechanical strength. Any amounts in excess of 70 parts by weight however result in reduced heat resistance. No particular limitation is imposed on the relative proportions of the unit derived from the (meth)acrylonitrile monomer and that derived from the (meth)acrylic ester type monomer. Their relative proportions may be suitably determined depending upon what end use is. Needless to say, either one of these units may be used singly without encountering any problems or inconvenience.

If the proportion of the unit derived from the phenylmaleimide-type monomer is less than 2 parts by weight, the resulting copolymer has low heat resistance. However, any amounts greater than 25 parts by weight lead to reduced mechanical strength.

The weight ratio (b)/(c) is at least 0.3, preferably at least 0.7, most preferably at least 1.2. This ratio is important in assuring good mechanical strength to the resultant product. If the ratio (b)/(c) is smaller than 0.3, the resultant copolymer has low tensile strength and Izod impact strength. It therefore develops such problems as cracks by impact upon molding or fabrication of the copolymer or upon the use of molded articles in actual applications.

The content of the unreacted phenylmaleimide still remaining in 100 parts by weight of the copolymerized resin composition of this invention must be 0.2 part by weight or less. Any contents greater than 0.2 part by weight lead not only to reduced heat resistance but also to cumulative sticking of the phenylmaleimide-type monomer on the inner walls and vent of a mold, thereby causing stain on the surfaces of molded or fabricated articles or making it difficult to continue stable molding or fabrication. Besides, the occurrence of die lives becomes serious in extrusion molding or fabrication. Namely, the remaining phenylmaleimide-type monomer produces extremely serious deleterious effects to molding or fabrication work as compared to the styrene-type monomer, (meth)acrylonitrile monomer or (meth)acrylic ester type monomer which is routinely employed.

Incidentally, one or more monomer components, other than the aforementioned monomers and copolymerizable with them, may also be copolymerized in the copolymer of this invention provided that their contents are limited within such ranges so as not to impair the properties of the copolymer of this invention.

In the copolymer of the present invention, the Mw/Mn ratio, in which Mw means the weight average molecular weight and Mn denotes the number average molecular weight, must be maintained within 1.8–3.0, preferably 2.0–2.7.

In the present invention, these molecular weights are determined by measuring them in accordance with gel permeation chromatography (hereinafter abbreviated as "GPC") in the same manner as in the measurement of molecular weights of usual styrene homopolymers, and then converting the measurement results based on the measurement result obtained with respect to the standard polystyrene. In the present invention, GPC is effected by using tetrahydrofuran as a solvent and each molecular weight is calculated by rounding off any values smaller than 1,000.

The ratio Mw/Mn within the above-described numeral range can generally be attained by choosing suitable conditions, for example, by optimizing the state of mixing of the individual monomers in a reaction vessel (e.g., the type of the reaction vessel to be employed, stirring conditions, positional relationship between the feeding inlets for the monomers and the outlet for the withdrawal of the polymerization mixture in the reaction vessel, etc.), by using the continuous polymerization process, and by minimizing the polymerization of the mixture during its course from the polymerization reactor to an equipment for the separation and removal of volatile components as well as the crosslinking and decomposition of the resultant copolymer.

If the Mw/Mn ratio exceeds 3.0, the resulting copolymer has poor transparency even if the composition of the copolymer satisfies the above-described requirement. On the other hand, it has been found, by an investigation conducted by the present inventors, that it is difficult to control the Mw/Mn ratio smaller than 1.8 in usual industrial processes.

The copolymers of this invention have no particular problems in their actual applications so long as their monomer compositions and molecular weight ratios meet the corresponding requirements described above. It is however desirable from the viewpoint of mold smear and the sticking of gum-like matter that lesser amounts of components be caused to dissolve in methanol upon dissolution of a copolymer in methyl ethyl ketone and subsequent reprecipitation of the copolymer in methanol; in other words, the copolymer contains less methanol-soluble components. It is especially desirable that the total content of methanol-soluble components is below 5 wt. percent.

As an exemplary preparation process of a styrene-base copolymer composed of monomers in the above-specified composition and which have a Mw/Mn (Mw: weight average molecular weight; Mn: number average molecular weight) ratio with the above-specified range, the following process is mentioned.

A monomer mixture composed, for example, of 15–90 parts by weight of a styrene-type monomer, 2–70 parts by weight of a (meth)acrylonitrile monomer and/or a (meth)acrylic ester type monomer, 1–20 parts by weight of a phenylmaleimide-type monomer and if necessary, 0–30 parts by weight of one or more monomers copolymerizable with the aforementioned monomers is fed to an apparatus in which a complete-mixing vessel-type reactor and an equipment for the separation and removal of volatile components are connected in series, whereby a styrene-base copolymer is prepared continuously. By effecting the polymerization in such a manner that the ratio of the content (y wt. percent) of the phenylmaleimide-type monomer copolymerized in the resultant copolymer to the proportion (x wt. percent) in the monomer mixture fed for the polymerization reaction, i.e., the y/x ratio falls within a range of 0.9–4.0, preferably 1.3–2.0, the styrene-base copolymer of this invention can be prepared efficiently.

The complete-mixing vessel-type reactor employed in the above process is not necessarily limited to a reactor of any specific type. It is however desirable that the composition and temperature of the polymerization mixture are maintained substantially uniform at every point in the reaction vessel. Although no particular limitation is imposed on the number of vessel(s) of the complete-mixing vessel-type reactor, 1 or 2 is preferred with 1 being especially preferred.

As the equipment for the separation and removal of volatile components, an apparatus equipped with a preheater, vacuum vessel and discharge pump or a vented screw extrude is a typical example. An apparatus constructed of one preheater and one vacuum vessel is preferably employed as such an equipment for the separation and removal of volatile components. It is preferable to maintain the internal pressure at a low level in the inlet zone of the preheater, since use of a higher pressure tends to promote reactions at the inlet zone of the preheater and encounters difficulties in controlling the Mw/Mn ratio.

The significance of the above-specified y/x ratio will next be described. In general, the y/x ratio decreases as the conversion of the phenylmaleimide-type monomer into the copolymer is reduced and/or the overall conversion of the monomers, which are subjected to the polymerization reaction, into the copolymer is increased. It has however been discovered that if the y/x ratio is 0.9 or smaller, the resulting copolymer has an Mw/Mn ratio greater than 3.0 and its transparency is not sufficient, thereby failing to obtain a copolymer which has an excellent transparency, even when the polymerization is conducted by using such a reactor as described above. A y/x ratio greater than 1.3 is preferable in obtaining a copolymer which has a still smaller Mw/Mn ratio.

The y/x ratio becomes greater, for example, as the overall conversion of monomers, which have been fed for a polymerization reaction, is rendered smaller. It is thus possible to prepare a copolymer with an Mw/Mn ratio of 3.0 or smaller even when the y/x ratio is 4 or greater. It is however necessary to control the overall conversion at a level lower than 25 percent in this case. Under such conditions, the heat consumption in the step for the separation and removal of volatile components and the labor for the recovery of unreacted monomers become greater, thereby resulting in a greater energy loss and enlargement of equipment. The use of such a large y/x ratio is therefore not preferable. In some instances, the resulting polymer is liable to undergo abnormal and excessive heating locally due to an increased heat consumption in the removal step of volatile components. As a consequence, the resultant copolymer is locally colored in brown.

As an exemplary method for maintaining the y/x ratio at a larger level, it is preferable to conduct the polymerization, in addition to the above-described conditions, by optimizing the positional relationship between the raw material inlet and the polymerization mixture outlet in the complete-mixing vessel-type reactor, namely, placing the inlet and outlet in positional relationship as remote from each other as possible, minimizing the polymerization from the discharge through the outlet of the reactor until the completion of its treatment in the equipment for the separation and removal of volatile components, or adjusting the mixing time in the reactor in accordance with the feed rates of the raw material monomers. For example, the mixing time may preferably be shortened as the feed rates of the raw material monomers are increased.

The term "mixing time in the complete-mixing vessel" as used herein means the time Tm required until the difference between the concentration of a labelling material in a sampled polymerization mixture and its corresponding theoretical mixing concentration falls within 5 percent, when a solution of 1 poise or so is introduced and agitated in a reactor, a solution of a specific amount of the labelling material (dye, solvent) is dissolved in another solvent of a type different from the former solvent is instantaneously poured while maintaining the agitation, and the liquid in the reaction vessel is thereafter sampled out little by little periodically. In the preparation of the usual polystyrene, the mixing between a fresh supply of the raw material and the reaction mixture in the complete-mixing reaction vessel can be satisfactorily performed so long as the average residence time $\theta$ of the reaction mixture in the vessel is 10 times the mixing time Tm or longer. In the preparation of the styrene-base copolymer of this invention, it is also preferable to set $\theta$ at a value 10 times or longer, or notably, 20 times or longer relative to Tm. In addition to controlling the mixing time under the above-mentioned conditions while preparing the styrene-base copolymer of this invention, it is also preferable to conduct its preparation by suitably combining the above-mentioned feeding method of the raw materials, the withdrawing method of the reaction mixture, etc.

In the above-described polymerization process, the feed solution of the monomer mixture may be charged in portions or may be additionally supplied in the reactor. In some instances, the individual monomer components may be separately charged in the reactor. They may also be additionally supplied. Separately from the styrene-type monomer, a raw material solution may be prepared from the phenylmaleimide monomer, the (meth)acrylonitrile monomer or (meth)acrylic ester type monomer and if necessary, a solvent. The raw material solution may then be fed from an independent reservoir which is separate from the styrene-type monomer. This is a preferable method.

For the preparation of the styrene-base copolymer of this invention, a radical polymerization process which makes use of a radical polymerization initiator is preferably employed.

As the radical polymerization initiator to be employed, a conventionally-known organic peroxide and azo compound may generally be mentioned. Its 10-hour half-life temperature is 70° C.–120° C., preferably, 75° C.–100° C. The polymerization temperature is 70° C.–150° C., preferably, 90° C.–130° C.

When using the polymerization reaction, a conventional molecular weight modifier, a solvent and the like may be added during the stage of the polymerization reaction and if necessary, a conventional plasticizer, a stabilizer for heat, light and the like, and a mold-release compound may also be added during the desired stages.

The copolymers of this invention may be used either singly or as mixtures with other resins such as polycarbonates, ABS resin and AB resin.

The present invention will hereinafter be described specifically by the following examples.

EXAMPLE 1

(i) Preparation of copolymer

Into a single complete-mixing vessel-type reactor, 105 parts of a mixture composed of 65 parts by weight of styrene, 5 parts by weight of N-phenylmaleimide, 30 parts of methyl methacrylate and 5 parts of ethyl benzene and 5 parts of an ethylbenzene solution containing 0.03 part of tert-butyl peroxy-2-ethylhexanoate were continuously fed per hour by using separate feed pumps.

The reactor was internally equipped with-drafted screw-type agitating blades and in the inlet zone for the raw materials feed, with a turbine impeller. The revolution speeds of both agitators were maintained at 150 rpm. Under these conditions, the mixing time was 3 minutes or shorter. The raw material inlets were located in a lower part of the vessel, and the polymerization mixture was withdrawn from an upper part of the vessel. The withdrawal rate of the mixture was 110 parts by weight per hour, like the feed rate of the monomers. The average residence time in the reactor was set for 2 hours, while the reaction time was maintained at 115° C. The polymerization mixture, which had been withdrawn from the outlet of the vessel, was continuously introduced through a double-walled pipe with a jacket temperature of 110° C. into an equipment for the separation and removal of volatile components, which was constructed of a preheater equipped with a pressure control valve at the inlet thereof and a vacuum vessel (a vessel for the removal of volatile components). The inlet of the preheater was maintained at a vacuum of 400–600 Torr, whereas the vacuum vessel was held at 10 Torr. The resultant copolymer was continuously withdrawn from a lower part of the vacuum vessel to obtain the copolymer as pellets. The monomers and ethylbenzene separated from the polymerization mixture were withdrawn from an upper part of the vacuum vessel. They were recovered in their entirety in a reservoir which was maintained at −5° C. The amount of the thus-recovered solution (recovered solution) was 65 parts by weight per hour.

The ratio of the weight average molecular weight Mw of the copolymer to its number average molecular weight Mn, namely, Mw/Mn, was measured on the basis of the method described above.

(ii) Analysis of the composition of the copolymer

The recovered solution was analyzed by gas chromatography and liquid chromatography so as to determine the relative proportions of the recovered styrene, N-phenylmaleimide, methyl methacrylate and ethyl benzene. The content of the unreacted N-phenylmaleimide remaining uncopolymerized in the copolymer pellets was measured by dissolving the pellets in methyl ethyl ketone, reprecipitating the copolymer in methanol, removing the precipitate and then measuring the amount of N-pheylmaleimide contained in the methanol. In addition, the amount of the methanol-reprecipitated copolymer was also measured. Based on its difference from the amount of the pellets employed in the test, the amount of methanol-soluble components was determined. The amounts of methanol-soluble components per 100 parts by weight of the corresponding copolymers are shown in Table 1.

From the feed amounts of raw materials, the amount of the recovered solution and the results of analysis on the composition of the recovered solution, the composition of the individual monomers in the copolymer was determined.

(iii) Evaluation of physical properties of copolymer

The resultant copolymer was injection-molded at a cylinder temperature of 230° C. to determine its physical properties. The evaluation of its physical properties was conducted in accordance with the following methods:

Heat resistance: Vicat softening point by ASTM D-1525.

Mechanical strength: Izod impact strength and tensile strength in accordance with JIS K 6871.

Transparency: Haze by ASTM D-1925. Lower haze values are evaluated as higher transparency.

Mold smear: The degree of smear of a mold was observed after conducting injection molding 600 shots. The evaluation was made in 4 ranks ranging from smear-free good results to heavily-smeared results in order. The results are shown by ⊚, ○, Δ and X.

Color tone: Yellowness index by ASTM D-1925.

The reaction conditions, the analysis of the composition of the copolymer and the evaluation results of its physical properties are summarized in Table 1.

EXAMPLES 2 & 3

The procedures of Example 1 were repeated except that the composition of the monomers fed into the reactor was changed as shown in Table 1. Test conditions and results are given in Table 1.

EXAMPLE 4

The procedures of Example 1 were repeated except that N-orthochlorophenylmaleimide was used as a phenylmaleimide-type monomer, the composition of the monomers fed into the reactor was changed as shown in Table 1 and the degree of vacuum in the vessel for the removal of volatile components was changed to 25 Torr. Test conditions and results are given in Table 1.

The resultant copolymer had a low yellowness index and was hence excellent.

EXAMPLE 5

The procedures of Example 1 were repeated except that styrene, acrylonitrile and N-phenylmaleimide were used as starting monomers in their corresponding proportions shown in Table 1, 0.13 part of t-dodecylmercaptan was additionally incorporated, the reaction temperature was set at 120° C., the average residence time was controlled for 1 hour and the degree of vacuum in the vessel for the removal of volatile components was changed to 20 Torr. Test conditions and results are given in Table 1.

EXAMPLE 6

The procedures of Example 1 were repeated except that the composition of the monomers fed into the reactor was changed as shown in Table 1. Test conditions and results are given in Table 1.

COMPARATIVE EXAMPLE 1

A copolymer outside the scope of the present invention was prepared in the same manner as in Example 1 except that the composition of the monomers fed into the reactor was changed as shown in Table 1. Test conditions and results are given in Table 1.

The Izod impact strength and tensile strength were lower into compared with the copolymer obtained in Example 1.

COMPARATIVE EXAMPLE 2

In a vessel-type reactor provided with stirrer, 30 parts by weight of ethylbenzene, 65 parts by weight of styrene and 20 parts by weight of methyl methacrylate were charged. After heating the contents to 100° C. with stirring, a solution of 0.13 parts by weight of 1,1-bis(tert-butylperoxy)-3,5,5-trimethylcylohexane dissolved in 5 parts by weight of ethylbenzene was poured at once into the reactor. Thereafter, while continuously feeding a liquid mixture of 15 parts by weight of ethylbenzene, 10 parts by weight of methyl methacrylate and 5 parts by weight of phenylmaleimide into the reactor, they were polymerized at 100° C. for 3 hours, followed by further polymerization at 110° C. for 2 hours. The reaction mixture was withdrawn from the reactor and maintained under vacuum (10-5 Torr) in an oven of 210° C., thereby removing volatile components. Test conditions and results are shown in Table 1.

The Mw/Mn ratio of the resultant copolymer was 3.4, which was outside the corresponding range defined in the present invention. The copolymer had low transparency.

The mold smear test was not conducted.

COMPARATIVE EXAMPLE 3

The procedures of Example 1 were repeated except that the degree of vacuum in the vessel for the removal of volatile components was changed to 80 Torr. Test conditions and results are given in Table 1.

The content of the remaining phenylmaleimide was high, and the mold smear was severe.

COMPARATIVE EXAMPLE 4

The procedures of Example 1 were repeated except that the composition of the monomers fed into the reactor was changed as shown in Table 1. Test conditions and results are given in Table 1.

The resultant copolymer contained the methyl methacrylate unit in a high proportion and had a low heat-resistant temperature.

COMPARATIVE EXAMPLE 5

The procedures of Example 1 were repeated except that the composition of the monomers fed into the reactor was changed as shown in Table 1, the reaction temperature was set at 120° C. and the average residence time was set for 1 hour. Test conditions and results are given in Table 1.

The resultant copolymer contained the phenylmaleimide-type monomer in a high proportion, and its tensile strength and Izod impact strength were both low.

COMPARATIVE EXAMPLE 6

The procedures of Example 1 were repeated except that the composition of the monomers fed into the reactor was changed as shown in Table 1, the supply of tert-butyl peroxy-2-ethylhexanoate was omitted, the reaction temperature was set at 130° C. and the average residence time was set for 4hours. Test conditions and results are given in Table 1.

The resultant copolymer contained neither acrylonitrile monomer nor acrylic ester type monomer and showed low tensile strength.

COMPARATIVE EXAMPLE 7

An emulsion polymerization was initiated by dispersing 20 parts by weight of acrylonitrile, 64 parts by weight of styrene, 10 parts of N-o-chlorophenylmaleimide, 5 parts of sodium laurylsulfate and 0.25 part by weight of tert-dodecyl mercaptan into water. The same amounts of the same monomers were added over a ½ hour period to the reaction mixture. The reaction was terminated at a conversion of about 70%. After removal of the water and remaining monomers, the properties of the resultant polymer were evaluated. Its transparency was at a very low level and its haze was 11%. Its Mw/Mn was 3.8.

TABLE 1

|  |  |  | Example 1 | Example 2 | Example 3 | Example 4 | Example 5 | Example 6 |
|---|---|---|---|---|---|---|---|---|
| Reaction conditions | Feed monomer composition (wt. parts) | (a) Styrene | 65 | 52 | 78 | 66 | 72 | 52 |
|  |  | (b) Methyl methacrylate | 30 | 45 | 15 | 30 | — | 40 |
|  |  | (b) Acrylonitrile | — | — | — | — | 24 | 5 |
|  |  | (c) Phenylmaleimide-type monomer (x) | 5 | 3 | 7 | 4 | 4 | 3 |
|  | Reaction temperature (°C.) |  | 115 | 115 | 115 | 115 | 120 | 115 |
|  | Average residence time in reactor (hr) |  | 2.0 | 2.0 | 2.0 | 2.0 | 1.0 | 2.0 |
| Analysis results | Resultant copolymer composition (wt. parts) | (a) Styrene-type monomer | 62 | 50 | 75 | 64 | 70 | 49 |
|  |  | (b) Methyl methacrylate or Acrylonitrile | 29 | 44 | 14 | 28 | 23 | 45 |
|  |  | (c) Phenylmaleimide-type monomer (y) | 9 | 6 | 11 | 8 | 7 | 6 |
|  |  | (b)/(c) | 3.2 | 7.3 | 1.3 | 3.1 | 3.3 | 7.5 |
|  | Remaining phenylmaleimide monomer (wt. %) |  | 0.04 | 0.03 | 0.09 | 0.1 | 0.06 | 0.03 |
|  | Mw/Mn ratio |  | 2.4 | 2.3 | 2.6 | 2.6 | 2.4 | 2.4 |
|  | Methanol-soluble components (wt. %) |  | 1.1 | 1.1 | 1.4 | 1.0 | 1.4 | 1.1 |
|  | y/x |  | 1.8 | 2.0 | 1.6 | 2.0 | 1.8 | 2.0 |
| Physical properties | Transparency (haze) (%) |  | 0.7 | 0.8 | 0.9 | 0.6 | 0.9 | 0.9 |
|  | Vicat softening point (°C.) |  | 127.5 | 122.0 | 131.0 | 126.0 | 128.0 | 121.0 |
|  | Izod impact strength (kg · cm/cm) |  | 2.4 | 2.5 | 2.3 | 2.3 | 2.1 | 2.3 |
|  | Tensile strength (kg/cm$^2$) |  | 510 | 540 | 480 | 500 | 530 | 535 |
|  | Yellowness |  | 18 | 13 | 17 | 11 | 25 | 15 |
|  | Mold smear |  | ◉ | ◉ | ○ | ○ | ○ | ◉ |

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Reaction conditions | Feed monomer composition (wt. parts) | (a) Styrene | 93 | 65 | 65 | 20 | 60 | 95 |
|  |  | (b) Methyl methacrylate | 2 | 30 | 30 | 75 | 25 | — |
|  |  | (b) Acrylonitrile | — | — | — | — | — | — |
|  |  | (c) Phenylmaleimide-type monomer (x) | 5 | 5 | 5 | 5 | 15 | 5. |
|  | Reaction temperature (°C.) |  | 115 | 100–120 | 115 | 110 | 120 | 130 |
|  | Average residence time in reactor (hr) |  | 2.0 | (Batch) | 2.0 | 2.0 | 1.0 | 4 |
| Analysis results | Resultant copolymer composition (wt. parts) | (a) Styrene-type monomer | 90 | 68 | 62 | 19 | 51 | 91 |
|  |  | (b) Methyl methacrylate or Acrylonitrile | 2 | 25 | 29 | 72 | 21 | — |
|  |  | (c) Phenylmaleimide-type monomer (y) | 8 | 6 | 9 | 9 | 28 | 9 |

TABLE 1-continued

| | | | | | | | |
|---|---|---|---|---|---|---|---|
| | (b)/(c) | 0.25 | 4.1 | 3.2 | 8 | 0.7 | 0 |
| | Remaining phenylmaleimide monomer (wt. %) | 0.04 | 0.1 | 0.3 | 0.03 | 0.1 | 0.04 |
| | Mw/Mn ratio | 2.9 | 3.4 | 2.4 | 2.7 | 2.8 | 2.4 |
| | Methanol-soluble components (wt. %) | 1.2 | 1.2 | 2.3 | 1.2 | 3.0 | 3.0 |
| | y/x | 1.6 | 1.2 | 1.8 | 1.8 | 2.0 | 1.8 |
| Physical properties | Transparency (haze) (%) | 0.7 | 4.0 | 1.0 | 0.7 | 5.0 | 0.8 |
| | Vicat softening point (°C.) | 125.0 | 120.0 | 119.0 | 118.0 | 162.0 | 126.0 |
| | Izod impact strength (kg · cm/cm) | 1.9 | 2.1 | 2.2 | 2.1 | 1.1 | 1.7 |
| | Tensile strength (kg/cm²) | 380 | 440 | 410 | 470 | 270 | 390 |
| | Yellowness | 19 | 28 | 18 | 17 | 35 | 17 |
| | Mold smear | ⊙ | — | X | ⊙ | ○ | ○ |

As is understood from Table 1, the copolymers of this invention have extremely high heat resistance, transparency and mechanical strength, and hence have great industrial value for their utility as transparent and heat-resistant molding materials.

What is claimed is:

1. In a transparent heat-resistant styrene-base copolymer comprising (a) 30 to 80 parts by weight of a unit derived from a styrene-base monomer, (b) 5 to 70 parts by weight of a unit derived from a monomer selected from the group consisting of a (meth)acrylonitrile monomer and a (meth)-acrylic ester monomer, and (c) 2 to 25 parts by weight of a unit derived from a phenylmaleimide monomer selected from the group consisting of an N-phenylmaleimide substituted by a substituted phenyl group at the N-position and an N-phenylmaleimide substituted by an unsubstituted phenyl group at the N-position, all based on 100 parts by weight of the copolymer, the improvement wherein:
   (1) the ratio (b)/(c) is at least 0.3;
   (2) the ratio of the weight average molecular weight Mw of the copolymer to the number average molecular weight Mn of the copolymer in the copolymer, Mw/Mn, is 1.8 to 3.0;
   (3) the amount of the phenylmaleimide monomer still remaining in the copolymer is not more than 0.2 weight percent; and
   (4) the copolymer containing methanol-soluble matter in an amount below 5 weight percent.

2. A copolymer as claimed in claim 1, wherein the copolymer comprises (a) 40 to 70 parts by weight of the unit derived from the styrene-base monomer, (b) 10 to 60 parts by weight of the unit derived from the (meth)acrylonitrile monomer or the (meth)acrylic ester monomer, and (c) 10 to 20 parts by weight of the unit derived from the phenylmale-imide monomer, all based on 100 parts by weight of the copolymer.

3. A copolymer as claimed in claim 2, wherein the copolymer comprises 15 to 40 parts by weight of the unit derived from the (meth)acrylonitrile monomer or the (meth)acrylic ester monomer.

4. A copolymer as claimed in claim 1, wherein the styrene-base monomer is styrene, α-methylstyrene, o-methylstyrene, m-methylstyrene, p-methylstyrene, ring-, α- or β-substituted bromostyrene, t-butylstyrene or chlorostyrene.

5. A copolymer as claimed in claim 4, wherein the styrene-base monomer is styrene or α-methylstyrene.

6. A copolymer as claimed in claim 1, wherein the (meth)acrylic ester monomer is a $C_{1-10}$ alkyl ester of acrylic acid or methacrylic acid.

7. A copolymer as claimed in claim 6, wherein the (meth)acrylic ester monomer is methyl acrylate, ethyl acrylate or methyl methacrylate.

8. A copolymer as claimed in claim 1, wherein the phenylmaleimide monomer is N-o-chlorophenylmaleimide or N-o-methoxyphenylmaleimide.

9. A process for the preparation of a copolymer as claimed in claim 1, which comprises continuously polymerizing a monomer mixture, which is composed of 15 to 90 parts by weight of the styrene-base monomer, 2 to 70 parts by weight of the (meth)acrylonitrile monomer or the (meth)acrylic ester monomer, 1 to 20 parts by weight of the phenylmaleimide monomer and 0 to 30 parts by weight of a further monomer copolymerizable therewith, at a temperature of 70° to 150° C. in the presence of a radical polymerization initiator while maintaining the monomer mixture in a completely mixed state and then removing volatile components from the resulting reaction mixture, in which the ratio of the weight percent amount y of the phenylmaleimide monomer copolymerized in the copolymer to the weight percent amount x of the phenylmaleimide monomer in the monomer mixture, y/x, is 0.9 to 4.0.

10. A process as claimed in claim 9 wherein the polymerization initiator has a 10-hour half-life temperature of 70° to 120° C.

11. A process as claimed in claim 9 wherein the ratio y/x is 1.3 to 2.0.

* * * * *

UNITED STATES PATENT AND TRADEMARK OFFICE
CERTIFICATE OF CORRECTION

PATENT NO. : 5,191,046

DATED : Mar. 2, 1993

INVENTOR(S) : IWAMOTO et al.

It is certified that error appears in the above-identified patent and that said Letters Patent is hereby corrected as shown below:

On the title page:   Related U.S. Application Data should read as follows:

Item: [63] Continuation of Ser. No. 524,695, May 18, 1990, abandoned, which is a continuation of Ser. No. 867,098, May 27, 1986, abandoned.

Signed and Sealed this

Twenty-first Day of December, 1993

Attest:

BRUCE LEHMAN

*Attesting Officer*   Commissioner of Patents and Trademarks